United States Patent

[11] 3,615,757

[72] Inventors Andrew Herczog
Painted Post;
Margaret M. Layton, Big Flats, both of N.Y.
[21] Appl. No. 733,293
[22] Filed May 31, 1968
[45] Patented Oct. 26, 1971
[73] Assignee Corning Glass Works
Corning, N.Y.

[54] HIGH DIELECTRIC CONSTANT NIOBATE-TITANATE GLASS-CERAMIC ARTICLES
4 Claims, No Drawings

[52] U.S. Cl....................................................... 106/39 DY,
106/52, 65/33
[51] Int. Cl....................................................... C04b 33/00
[50] Field of Search........................................... 106/39 DV,
39 C, 52, 39; 65/33

[56] References Cited
UNITED STATES PATENTS
| | | | | |
|---|---|---|---|---|
| 2,695,239 | 11/1954 | Oshry............................ | | 106/39 |
| 2,695,240 | 11/1954 | Oshry............................ | | 106/39 |
| 3,114,066 | 12/1963 | Allen et al. ................... | | 313/108 |
| 3,195,030 | 7/1965 | Herczog et al................. | | 317/258 |

OTHER REFERENCES

Ulrich et al.— J. Amer. Cer. Soc., Vol. 49, No. 4 Apr. 1966, pp. 210– 215 "Devitrified Barium Titanate Dielectrics."

Herczog— Glass Industry, Vol. 47, Aug. 1967, pp. 445– 450 "Ferroelectrics and Ferrites Crystallized from Glass."

Primary Examiner—Tobias E. Levow
Assistant Examiner—W. R. Satterfield
Attorneys—Clarence R. Patty, Jr. and Clinton S. Janes, Jr.

ABSTRACT: This invention relates to the manufacture of glass-ceramic materials which are especially well suited for the production of high-performance capacitors. These materials are transparent, are essentially free from $Na_2O$, and contain crystals preferably of alkaline earth niobates or titanates, varying in size between about 100–2,000 A.

HIGH DIELECTRIC CONSTANT NIOBATE-TITANATE GLASS-CERAMIC ARTICLES

The practical considerations and the theoretical concepts involved in the manufacture of glass-ceramic articles are discussed in detail in U.S. Pat. No. 2,920,971 and reference is made thereto for a more complete explanation of these factors. However, in brief, the production of glass-ceramic articles comprises three general steps: (1) a glass-forming batch commonly containing a nucleating agent is melted; (2) this melt is simultaneously cooled to a glass and an article of a desired configuration shaped therefrom; and (3) the glass article is subjected to a particular time-temperature schedule whereby nuclei are initially developed within the glass which provides sites for the growth of crystals thereon as the heat treatment is continued.

Inasmuch as this crystallization in situ of the glass article is the result of substantially simultaneous growth of crystals on countless nuclei, a glass-ceramic article has a structure consisting of relatively uniformly sized, fine-grained crystals (generally 0.1–20 microns) uniformly dispersed in a residual glassy matrix, the crystals constituting at least 50 percent by weight and, frequently, over 75 percent by weight of the article. This very high crystal content yields a product demonstrating chemical and physical properties which are normally quite different from those exhibited by the parent glass article but which are more similar in character to those of a crystalline ceramic article. Furthermore, the very high crystallinity of a glass-ceramic article results in the residual glassy matrix having a much different composition from that of the parent glass since the components making up the crystals will have been precipitated therefrom. Finally, inasmuch as the crystallization occurs in situ, a glass-ceramic article is nonporous and free from voids.

This combination of homogeneity, pore-free structure, and small crystal size has motivated extensive research in the preparation of ferroelectric materials from glass-ceramic bodies. The commercially available capacitors produced through the sintering of ferroelectric materials have two disadvantageous features: (1) they are porous and (2) they are not perfectly smooth. Capacitors desirably have high capacitance coupled with high dielectric strength. However, the capacitance of a dielectric film is inversely proportional to the thickness thereof whereas the dielectric strength thereof is directly proportional to the thickness. Therefore, thin films are desirably for high capacitance per unit volume but are less resistant to voltage breakdown and destruction resulting from physical imperfection and mechanical abuse. An inherent failure of these sintered capacitors is that field emissions and corona discharge emanate from the metal electrode adjacent to sharp points or voids in the dielectric layer. It has been recognized that layers of dielectric materials which are free of voids and having smooth surfaces demonstrate greater dielectric strength than those having a rough texture. It is an intrinsic character of sintered layers of dielectric materials that the surfaces thereof cannot be smoother than the grain size of the ingredients therein. Finally, sintered articles inherently possess some porosity. These projections and holes in the dielectric layers become sources of dielectric breakdown. As opposed to this, a film of glass-ceramic material, being composed of very fine-grained crystals homogeneously dispersed in a glassy matrix, is nonporous and presents a smooth surface.

U.S. Pat. No. 3,195,030 discloses the manufacture of glass-ceramic articles composed of ferroelectric materials. The difficulties in producing such articles can be fully appreciated when the difference in the chemical composition of a ferroelectric glass-ceramic and that of the common glass-ceramic utilized as culinary ware, building cladding, etc. is recognized. The latter normally consists of silicates with natural glass-forming habits and the significant problem in manufacture is to induce crystallization in a stable glass in the proper manner. Contrary to this, however, the known ferroelectric materials contain no glass-forming constituents. Hence, the critical problem was to produce a glass comprising a very minor proportion of network-forming ingredients such that the highest percentage possible of the ferroelectric materials would be included in order to take the fullest advantage of the ferroelectric properties thereof. That patent broadly discloses the preparation of glass-ceramic articles from the whole general group of oxygen-octahedra ferroelectric compounds and, particularly, those compounds having a perovskitelike crystal structure.

U. S. Pat. No. 3,114,066 discloses the manufacture of transparent ferroelectric glass-ceramic articles wherein the crystal phase developed in situ is sodium niobate and/or barium metaniobate. Such articles, through well suited for many applications, are subject to degradation phenomena when exposed simultaneously to high DC electric fields and elevated temperatures.

Therefore, the principal object of this invention is to provide transparent glass-ceramic materials of high dielectric constant which exhibit good performance characteristics thereby making them very useful in high-performance miniature capacitors and in applications for electro-optic or electroluminescent devices. Good performance characteristics involve high dielectric breakdown strength, high insulation resistance, low dissipation factor, high dielectric constant, and the stability of these properties as a function of all operating parameters of a capacitor such as temperature, time, DC and AC electric fields. Furthermore, in high-performance capacitors, piezoelectric effects, usually associated with high dielectric constant materials and ferroelectric hysteresis, should be very small, and preferably, absent.

We have discovered that this object can be achieved in solid solutions of alkaline earth niobates and titanates which are essentially free from sodium ions and wherein the crystals range in size between about 100–2,000 A. In general, glasses according to the instant invention contain the constituent oxides of the desired high-permittivity phase and network formers. The high-permittivity phases suitable for the invention can be expresses by the formulas $A^{2+}B^{4+}O_3$, $A^{2+}B_2^{5+}O_6$, and $A_2^{2+}B_2^{5+}O_7$, where A and B are cations having the valences as indicated and O represents oxygen. The first formula is used here for the perovskite-type titanate crystal structure and the latter two reflect the tungsten bronze type of niobate crystal lattices. Hence, the glass utilized to crystallize these phases must contain cations A, B, and network-forming cations N. In compositions encompassed within this invention, the sum of all cations B divided by the sum of all cations N, B/N, is greater than 1 on a molar basis.

The amount of cations A should be approximately the content required by the stoichiometry of the crystallized phase. Hence, for securing perovskite-type phases, B/A ranges about 0.8 –1.2 on a molar basis. To obtain tungsten bronze-type phases, B/A may vary between about 2–1 on a molar basis. When appreciably more or fewer A-cations are used than required, a significant decrease in the yield of crystallization becomes apparent. The nature of cations A and B is determined by the crystal phase to be produced. The optimum A/B ratio is usually slightly higher than called for by crystal stoichiometry.

To insure a transparent product, B/N should range between about 1–2.5 or higher on a molar basis. Preferably, $SiO_2$ with or without the addition of $Al_2O_3$ or small amounts of $B_2O_3$ or $P_2O_5$ constitute N, the network-forming complement. In such compositions, then, where barium titanate is the high permittivity phase $$B/N = \frac{\text{Weight of } TiO_2/\text{molecular weight of } TiO_2}{\text{Weight of } SiO_2/\text{molecular weight of } SiO_2}$$

Our preferred composition for yielding crystal phases having the formula $A^{2+}B^{4+}O_3$, such as $BaTiO_3$, consist essentially, by weight, about 50–65 percent $A^{2+}O$, 20–35 percent $B^{4+}O_2$, and the remainder network formers. With respect to the compositions producing crystal phases within the formulas $A^{2+}B_2^{5+}O_6$, and $A_2^{2+}B_2^{5+}O_7$, our preferred compositions consist essentially by weight, of about 15–45 percent $A^{2+}O$, 40–70 percent $B_2^{5+}O_5$, in this case $Nb_2O_5$, and the remainder network formers. The total amount of network formers, on the oxide basis, should not exceed 20 percent by weight and the highest crystal contents are secured where the total amount of network formers is less than 10 percent by weight of the total composition. Ideally, $BaTiO_3$ constitutes the phase $A^{2+}B^{4+}O_3$ and solid solutions of alkaline earth metal niobates comprise the phases $A^{2+}B_2^{5+}O_6$ and $A_2^{2+}B_2^{5+}O_7$.

Table I reports compositions, expressed in weight percent on the oxide basis, thermally crystallizable glasses which, upon devitrification, form crystals of the oxygen-octahedra compounds having the above-recited formulas. The ingredients composing the glass-forming batches may be any materials, either oxides or other compounds, which upon being melted together, are converted to the desired oxide compositions in the proper proportions. The batch materials, in very fine subdivision, were thoroughly blended together and then melted in open platinum crucibles at 1,450°–1,550° C., depending upon the composition, for 1 hour. The melt was thereafter poured into the lower concave part of a round steel press. The convex-shaped upper part of the press was lowered, squeezing the molten material to a layer of a predetermined thickness, this thickness being varied according to the stability of the glass and/or the sample shape requirements. The melt was quenched to a temperature at least below the transformation range thereof i.e., that temperature at which a liquid melt is deemed to have been transformed to an amorphous solid which is commonly considered to be between the strain point and annealing point of a glass. If desired, fine glass particles can be sintered or sealed to lamellar configurations by heating to the softening point with simultaneous pressing. The glass articles were then crystallized in situ by exposure to the various heat treatments reported in table II, the crystals comprising at least 60 percent by weight and, frequently, more than 75 percent by weight of the theoretical yield of the high-permittivity phase.

We have determined that the rate of quenching the molten batch material to the transformation range must be at least 100° C./second. If a slower quenching rate is employed, crystallization begins at the higher temperatures and rapid grain growth takes place. This results in nonuniformity of crystal size in the final product.

We have learned that fine-grained, transparent articles can by crystallized in situ where heat treatments in the range of 650°–1,000° C. are utilized. The crystallization process is somewhat dependent upon the heating rate. Thus, heating rates greater than about 500° C./hour produce undesirably grain growth.

The dielectric properties of these crystallized articles are directly related to the maximum temperature employed in the heat treatment and the duration of the treatment at that temperature. The use of holding periods at the maximum heat-treating temperature is beneficial in optimizing the dielectric properties but this is not mandatory when heating rates of less than 500° C./hour and comparable cooling rates are employed. The maximum heat-treating temperature utilized has little effect upon crystal content but has a great effect upon grain size and may lead to the growth of undesirably secondary crystal phases. Depending upon composition, grain growth has a different dependence upon temperature so that the most convenient heat-treating temperature is determined empirically. This temperature ranges between the annealing point and 50°–100° C. above the crystallization peaks of a differential thermal analysis (DTA) diagram for the individual glass. Therefore, the determination of the most convenient heat-treating temperature is believed to be well within the technical ability of a person of ordinary skill in the art. Hence, in some glasses grain growth is rapid and the maximum heat-treating temperature employed to secure fine-grained, transparent glass-ceramic articles is as low as 650° C.; whereas in other glasses grain growth is a very gradual function of heat treatment temperature such that 1,000° C. may be required.

The glass compositions of the instant invention can be crystallized in situ to the desired fine-grained, transparent articles without the addition of a nucleating agent per se. It has been theorized that the homogeneous nucleation can be attributed to microheterogeneities forming part of the glass structure but having a composition and a short range order comparable to that of the crystal phase obtained in the further heat treatment. Nucleating is then explained by breaking the bonds between the microheterogeneities and the glass network through thermal activation and coalescence of the pseudocrystalline, phase-separated particles to stable crystalline nuclei and grains. This mechanism satisfactorily accounts for both the completeness of crystallization without grain growth and the rapidity thereof. It also suggests that further grain growth may take place by the same coalescence mechanism without change in the concentration of the respective phases.

The formation of pseudocrystalline microheterogeneities in the structure of glass can be attributed to supersaturation of the glass network with respect to certain types of cations. These cations, such as $Ti^{4+}$ and $Nb^{5+}$, form stable oxides in lattices where oxygen is octahedrally coordinated and corner-shared and can substitute for true network-forming cations in oxide glasses up to a certain limit. Randomness of the glass network is ascribed to some flexibility of Si-O-Si or similar network former's bond angles. Cations like $Ti^{4+}$ and $Nb^{5+}$ lack this bond angle flexibility. IF these cations are not associated with a true network former as a nearest neighbor, they become structurally ordered with respect to each other and the surrounding oxygen ions. These structurally ordered regions can have a dimension from a few unit cells up to the size of a stable nucleus, believed to be about 50 A. Size and number of these pseudocrystalline regions depends upon the ratio between the heterogeneity-forming cations and network-forming cations such as $Si^{4+}$, $B^{3+}$, $P^{5+}$, $Ge^{4+}$, and $Al^{3+}$. As has been noted above, the compositions complying with the instant invention require a molar ration between these two types of cations (B/N) of greater than 1.

Table I not only records the glass compositions but also the crystal structure of the phases present and the molar ratios B/N and B/A.

TABLE I
[Percent]

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| BaO | 12.8 | 12.6 | 12.6 | 12.9 | 18.9 | 13.0 | 15.6 | | 14.1 | 14.7 | 14.1 | 9.1 | 5.9 | 12.5 | 12.6 | 62.2 | 60.2 |
| $TiO_2$ | | | | | | | | | | | | | | | | 29.6 | 29.6 |
| SrO | 8.7 | 8.6 | 8.6 | 8.8 | 6.4 | 3.9 | | 20.5 | | 5.0 | | 6.1 | 16.0 | 8.5 | 8.6 | | |
| PbO | 17.8 | 18.2 | 17.3 | 17.7 | 13.8 | 21.6 | 22.6 | | 20.6 | 21.3 | 20.5 | 26.5 | 14.5 | 18.3 | 18.4 | | |
| CaO | 0.3 | 0.3 | | | 1.3 | 2.9 | | 2.6 | | 4.5 | | | | | | | |
| $Cu_2O$ | | | | | | | | | 4.6 | | | | | | | | |
| $K_2O$ | | | | | | | | | | | | | | | | | |
| $Nb_2O_5$ | 48.4 | 47.2 | 46.6 | 47.6 | 46.6 | 46.2 | 44.8 | 65.6 | 44.1 | 45.3 | 46.7 | 44.7 | 48.7 | 46.8 | 47.2 | | |
| $SiO_2$ | 7.6 | 5.4 | | 13.0 | 7.7 | 7.6 | 7.6 | 9.3 | 7.2 | 7.4 | 5.3 | 7.3 | 8.0 | 5.4 | 3.1 | 4.4 | 6.7 |
| $B_2O_3$ | 2.5 | 1.8 | | | | | | | | | | | | | 0.9 | | |
| $Al_2O_3$ | 1.9 | 5.9 | 2.9 | | 6.6 | 6.4 | 6.5 | | | 6.3 | 8.9 | 6.3 | 6.9 | 8.5 | 9.2 | 3.8 | 6.2 |
| $GeO_2$ | | | 12.0 | | | | | 11.4 | | | | | | | | | |
| $Ga_2O_3$ | | | | | | | | | | | | | | | | | |
| Main crystal structure | | | | | | | $A^{2+}B_2^{5+}O_6$ | | | | | | | | | $A_2$–$B_1$–$O_7$ | |
| B/N | 1.6 | 1.4 | 2.0 | 1.7 | 1.4 | 1.4 | 1.3 | 3.2 | 1.4 | 1.4 | 1.3 | 1.4 | 1.4 | 1.4 | 1.4 | 2.5 | 1.4 |
| B/A | 1.5 | 1.4 | 1.4 | 1.4 | 1.4 | 1.5 | 1.3 | 1.7 | 1.4 | 1.4 | 1.3 | 1.4 | 1.4 | 1.4 | 1.4 | 1.1 | 1.16 |

As has been explained hereinabove, the crux of the instant invention is the development of crystals of certain compositions having grain sizes between about 100–2,000 A. in glasses wherein the molar ratio of B/N is greater than 1. This very fine-grained material behaves essentially as a linear dielectric in every respect except for the application of electric fields well in excess of those used in capacitors, such as $10^5$ volts/cm. or more, close to dielectric breakdown voltage, when some nonlinearity can be observed. The lack of any trace of a ferroelectric transition in the very fine-grained material also indicates a crystal structure different from large-grained materials of the same composition or stoichiometry. This can be demonstrated by X-ray diffraction which reveals that $BaTiO_3$ of 1 micron size undergoes a tetragonal to cubic transformation at a temperature about 125° C. whereas 200 A. $BaTiO_3$ remains in a cubiclike structure at all temperatures.

Since the 100–2,000 A. material has a dielectric constant nearly independent of temperature, time, and applied field intensity within the operating range of a capacitor, and low loss tangents (0.1–1 percent), and because of the homogeneous and pore-free structure of a glass-ceramic product, the dielectric strength of these articles approaches $10^6$ volts/cm. These are obviously very valuable properties for a capacitor dielectric. Between this linear or nearly linear dielectric state characterized by 100 A. and 2,000 A. and the near-ferroelectric state reached at the 1 micron grain size there is a gradual and continuous transition. Above about 2,000A. this nonlinear behavior becomes too excessive for high-performance capacitor use and, further, the material becomes opaque due to particle size scattering.

Table II records the temperatures to which each example was subjected in the crystallization step. In each example, the glass articles were heated from room temperature to these crystallization temperatures at 100° C./hour, a 2 hour dwell period at that temperature was employed, and the crystallized articles were cooled to room temperature at the same rate. The lower temperature of heat treatment is chosen to obtain a grain size of 300–500 A. for maximum transparency. The higher temperature heat treatment gives an article of 1,000–2,000 A. grain size which may not have such clear transparency but still with properties described in the invention.

For electrical measurements, aluminum-nichrome-gold electrodes of 10 mm. diameter were deposited on both faces of the sample by vacuum evaporation. The dielectric constant was measured at 1 kilocycle.

TABLE II

| | 1 | 2 | 3 | 4 | 5 | 6 | 7 | 8 | 9 | 10 | 11 | 12 | 13 | 14 | 15 | 16 | 17 |
| --- | --- | --- | --- | --- | --- | --- | --- | --- | --- | --- | --- | --- | --- | --- | --- | --- | --- |
| Crystallization temperatures, ° C | 700 | 750 | 650 | 750 | 900 | 875 | 875 | 900 | 775 | 900 | 900 | 850 | 850 | 925 | 800 | 940 | 940 |
|  | 950 | 975 | 975 | 970 | 975 | ---- | 1,000 | ---- | 900 | 1,000 | 1,000 | 925 | 925 | 1,075 | 925 | 1,050 | 1,050 |
| Dielectric constants | 200 | 300 | 350 | 250 | 600 | 770 | 525 | 250 | 220 | 385 | 290 | 485 | 470 | 600 | 365 | 400 | 200 |
|  | 1,200 | 1,100 | 1,000 | 1,100 | 1,000 | ---- | 935 | ---- | 825 | 400 | 400 | 300 | 400 | 980 | 520 | 700 | 750 |

A grain size greater than about 2,000 A. with a dielectric constant approaching 4,000 can be achieved in some of these same materials at higher crystallization temperatures. However, in such materials, ferroelectric behavior becomes prevailing so that the properties are not well suited for high-performance capacitors and transparency is lost.

We claim:

1. A transparent, essentially $Na_2O$-free glass-ceramic article having a high dielectric constant and high dielectric strength consisting of submicroscopic crystals of oxygen-octahedra compounds selected from the group consisting of $A^{2+}B^{4+}O_3$, $A^{2+}B_{2a}^{5+}O_6$, and $A_2^{2+}B_2^{5+}O_7$, wherein A and B are cations having the valence indicated and O represents oxygen, dispersed in a residual glassy matrix, the molar ratio of the amount of B to the amount of network forming cations being greater than 1, the total amount of network-forming cations selected from the $5^+$, consisting of $Si^{4+}$, $B^{3+}$, $P^{5+}$, $Ge^{4+}$, $Al^{3+}$, and $Ga^{3+}$ not exceeding 20 percent by weight on the oxide basis, the molar ration of B/A in compounds of $A^{2+}B^{4+}O_3$ being between about 0.8–1.2, and the molar ratio of B/A in compounds of $A^{2+}B_2^{5+}O_6$ and $A_2^{2+}B_2^{5+}O_7$ being between about 2–1, said crystals comprising at least 60 percent by weight of the theoretical yield of the oxygen-octahedra compound and ranging between about 100–2,000 A. in diameter.

2. A transparent glass-ceramic article according to claim 1 wherein the molar ratio of the amount of B to the amount of network-forming cations is about 1–2.5.

3. A transparent glass-ceramic article according to claim 1 wherein the compounds of $A^{2+}B^{4+}O_3$ consist of alkaline earth metal titanates and the compounds of $A^{2+}B_2^{5+}O_6$ and $A_2^{2+}B_2^{5+}O_7$ consist of mixed alkaline earth metal niobates.

4. A transparent glass-ceramic article according to claim 3 wherein the compounds of $A^{2+}B^{4+}O_3$ consist essentially, by weight on the oxide basis, of about 50–65 percent $A^{2+}O$ and 20–35 percent $B^{4+}O_2$ and the compounds of $A^{2+}B_2^{5+}O_6$ and $A_2^{2+}B_2^{5+}O_7$ consist essentially, by weight on the oxide basis, of about 15–45 percent $A^{2+}O$ and 40–70 percent $B_2^{5+}O_5$.

* * * * *

UNITED STATES PATENT OFFICE
CERTIFICATE OF CORRECTION

Patent No. 3,615,757  Dated October 26, 1971

Inventor(s) Andrew Herczog and Margaret M. Layton

It is certified that error appears in the above-identified patent and that said Letters Patent are hereby corrected as shown below:

Column 2, line 72, change "$A^{2+}B^{25}$" to -- $A^{2+}B_2^{5}$ --

Column 2, line 73, change "$^+O_6$" to -- $^+O_6$ --

Column 3, line 7, change "$A_2^{2+}B^{25+}O_7$" to -- $A_2^{2+}B_2^{5+}O_7$ --

Column 3, line 48, change "undesirably" to -- undesirable --

Table I, column 17, change the amount of $TiO_2$ from "29.6" to -- 26.9 --

Claim 1, column 6, line 25, change "$A^{2+}B_{2a}^{5+}O_6$" to -- $A^{2+}B_2^{5+}O_6$ --

Claim 1, column 6, line 30, change "$5^+$" to -- group --

Signed and sealed this 25th day of April 1972.

(SEAL)
Attest:

EDWARD M. FLETCHER, JR.
Attesting Officer

ROBERT GOTTSCHALK
Commissioner of Patents